United States Patent [19]

Bäbler

[11] Patent Number: 5,347,014
[45] Date of Patent: Sep. 13, 1994

[54] PROCESS FOR PREPARING 1,4-DIKETO-3,6-DIPHENYLPYRROLO-[3,4-C]-PYRROLE

[75] Inventor: Fridolin Bäbler, Hockessin, Del.

[73] Assignee: Ciba-Geigy Corporation, Ardsley, N.Y.

[21] Appl. No.: 13,444

[22] Filed: Feb. 4, 1993

Related U.S. Application Data

[63] Continuation-in-part of Ser. No. 996,216, Dec. 23, 1992, abandoned.

[51] Int. Cl.$^5$ .......................................... C07D 487/04
[52] U.S. Cl. .................................................. 548/453
[58] Field of Search ......................................... 548/453

[56] References Cited

U.S. PATENT DOCUMENTS

| | | | |
|---|---|---|---|
| 4,415,685 | 11/1983 | Iqbal et al. | 524/92 |
| 4,517,320 | 5/1985 | Bäbler et al. | 523/215 |
| 4,579,949 | 4/1986 | Rochat et al. | 546/167 |
| 4,632,704 | 12/1986 | Bäbler | 106/288 |
| 4,720,305 | 1/1988 | Iqbal et al. | 106/288 |
| 4,992,101 | 2/1991 | Jaffe et al. | 106/498 |
| 5,063,258 | 11/1991 | Bäbler | 523/171 |
| 5,095,122 | 3/1992 | Bugnon et al. | 548/453 |

FOREIGN PATENT DOCUMENTS 9001480 2/1990 PCT Int'l Appl. .

OTHER PUBLICATIONS

Derw. Abst. 90-083469/11.

Chem. Abst. vol. 113, 1990, 68456k.

*Primary Examiner*—David B. Springer
*Attorney, Agent, or Firm*—George R. Dohmann

[57] ABSTRACT

A new platelet form of 1,4-diketo-3,6-diphenylpyrrolo-[3,4-C]-pyrrole which is prepared by heating 1,4-diketo-3,6-diphenylpyrrolo-[3,4-C]-pyrrole to elevated temperatures, preferably by recrystallization from an aromatic solvent or mixture of aromatic solvents, which is heated to an elevated temperature, generally a temperature higher than about 220° C., preferably above about 240° C., in the range from about 240° C. to about 280° C., most preferably from about 245° C. to 260° C. The platelets have an average particle size with a diameter of less than 4 μm and a thickness up to 1.5 μm and are distinguished from known crystal forms of 1,4-diketo-3,6-diphenylpyrrolo-[3,4-C]-pyrrole by the X-ray diffraction pattern and differential scanning calorimetry curve.

The new platelet form of 1,4-diketo-3,6-diphenylpyrrolo-[3,4-C]-pyrrole can be made from crude 1,4-diketo-3,6-diphenylpyrrolo-[3,4-C]-pyrrole and demonstrates a unique color shade effect and excellent heat resistance when utilized as a pigment. The new platelet form of 1,4-diketo-3,6-diphenylpyrrolo-[3,4-C]-pyrrole is particularly suitable for coloring high molecular weight organic material which can be processed to casted and molded articles and for the pigmentation of lacquers and enamel coating compositions, in particular automotive coating paints.

16 Claims, 4 Drawing Sheets

PROCESS FOR PREPARING 1,4-DIKETO-3,6-DIPHENYLPYRROLO-[3,4-C]-PYRROLE

CROSS REFERENCE TO RELATED APPLICATIONS

This is a continuation-in-part of Ser. No. 07/996,216, filed Dec. 23, 1992, now abandoned.

BACKGROUND OF THE INVENTION

This invention is directed to a new platelet form of 1,4-diketo-3,6-diphenylpyrrolo-[3,4-C]pyrrole and to a method of formation of the new platelet form of 1,4-diketo-3,6-diphenylpyrrolo[3,4-C]-pyrrole. The new platelet form is prepared by heating 1,4-diketo-3,6-diphenylpyrrolo[3,4-C]-pyrrole to elevated temperatures and can be made from crude 1,4-diketo-3,6-diphenylpyrrolo-[3,4-C]-pyrrol. The new platelet form of 1,4-diketo-3,6-diphenylpyrrolo-[3,4-C]-pyrrole demonstrates a unique color shade effect and excellent heat resistance when utilized as a pigment.

The use of 1,4-diketo-diaryl-pyrrolo-[3,4-C]-pyrroles as pigments is well known in the art, for example as disclosed in U.S. Pat. No. 4,415,685. These compounds have generally been found to be pigments of excellent quality.

In addition, many patents describe after-treatment, or so-called "conditioning" processes, to improve the quality of 1,4-diketo-diaryl-pyrrolo-[3,4-C]-pyrrole pigments.

U.S. Pat. No. 4,579,949 provides a procedure for obtaining a more opaque pigment form by heating 1,4-diketo-diaryl-pyrrolo-[3,4-C]-pyrrole pigments in water or an organic solvent. U.S. Pat. No. 4,720,305 teaches heat treatment of a 1,4-diketo-diaryl-pyrrolo-[3,4-C]-pyrrole pigment-water or organic solvent mixture (preferably above 80° C.) and subsequent comminution, such as wet grinding, in order to prepare transparent pigment forms.

U.S. Pat. No. 4,992,101 describes a process for increasing the opacity of 1,4-diketo-diaryl-pyrrolo-[3,4-C]-pyrrole pigments by milling the pigment in an alcohol in the presence of a base at a temperature below 50° C.

U.S. Ser. No. 07/726,612 discloses a process for converting crude pigments into pigmentary form by first premilling the pigment crude and then contacting the premilled pigment with a polar solvent at temperatures below 50° C., with or without particle growth inhibitors.

The 1,4-diketo-diaryl-pyrrolo-[3,4-C]-pyrroles described hereinabove are high chroma pigments with excellent pigment properties but do not offer lustre effects. To overcome this drawback, U.S. Pat. No. 5,095,122 discloses a 1,4-diketo-3,6-diphenylpyrrolo-[3,4-C]-pyrrole organic pigment which is in platelet-shape form and so achieves the desirable pearl lustre pigment without resorting to additives. The 1,4-diketo-3,6-diphenylpyrrolo-[3,4-C]-pyrrole consists of 50% by weight of platelets which are from 5 to 50 μm long, 2 to 50 μm wide and 0.01 to 5 μm thick, with the proviso that the ratios of length:thickness and width:thickness must be at least 3. The pigment platelets are formed by recrystallization in an organic solvent in which the pigment is soluble to a certain degree.

The platelets of the present invention are distinguished from those of U.S. Pat. No. 5,095,122 by the X-ray diffraction pattern, which clearly demonstrates that a different pigment form is produced under the present recrystallization conditions. The present process of preparing the crystals is distinguished from that disclosed in U.S. Pat. No. 5,095,122 by requiring that the 1,4-diketo-3,6-diphenylpyrrolo-[3,4-C]-pyrrole be heated to higher temperatures than those disclosed in U.S. Pat. No. 5,095,122. The new platelet pigment form of 1,4-diketo-3,6-diphenylpyrrolo-[3,4-C]-pyrrole has improved heat stability when incorporated in high-performance plastics, and a particle size which is preferred for use as a stir-in pigment for automotive coatings.

SUMMARY OF THE INVENTION

A new platelet form of 1,4-diketo-3,6-diphenylpyrrolo-[3,4-C]-pyrrole is prepared by heating 1,4-diketo-3,6-diphenylpyrrolo-[3,4-C]-pyrrole to an elevated temperature, generally above 220° C. More specifically, the 1,4-diketo-3,6-diphenylpyrrolo-[3,4-C]-pyrrole is prepared by recrystallization from an aromatic solvent or mixture of aromatic solvents which is heated to an elevated temperature, generally a temperature higher than about 220° C., preferably above about 240° C., in the range from about 240° C. to about 280° C., most preferably from about 245° C. to about 260° C.

The platelets have an average particle size with a diameter of less than 4 μm and a thickness up to 1.5 μm and are distinguished from known crystal forms of 1,4-diketo-3,6-diphenylpyrrolo-[3,4-C]-pyrrole by the X-ray diffraction pattern, which exhibits one very strong line corresponding to 2Θ double glancing angles of 6.5, one strong line corresponding to 19.5 and five relatively weak lines corresponding to 13.0, 14.8, 26.2, 26.4 and 27.2. The new platelet form of 1,4-diketo-3,6-diphenylpyrrolo-[3,4-C]-pyrrole by differential scanning calorimetry which does not show an diphenylpyrrolo-[3,4-C]-pyrrole by differential scanning calorimetry which does not show an endotherm peak between 300°–315° C. or decomposition up to 400° C.

The new platelet form of 1,4-diketo-3,6-diphenylpyrrolo-[3,4-C]-pyrrole can be made from crude 1,4-diketo-3,6-diphenylpyrrolo-[3,4-C]-pyrrole and demonstrates a unique color shade effect and excellent heat resistance when utilized as a pigment. The new platelet form of 1,4-diketo-3,6-diphenylpyrrolo-[3,4-C]-pyrrole is particularly suitable for coloring high molecular weight organic material which can be processed to casted and molded articles and for the pigmentation of lacquers and enamel coating compositions, in particular automotive coating paints.

The invention accordingly comprises the compounds, compositions and processes which will be exemplified in the construction hereinafter set forth.

BRIEF DESCRIPTION OF THE DRAWINGS

For a fuller understanding of the invention, reference is made to the following description taken in connection with the accompanying drawings, in which.

DETAILED DESCRIPTION OF THE PREFERRED EMBODIMENTS

Figure 1:
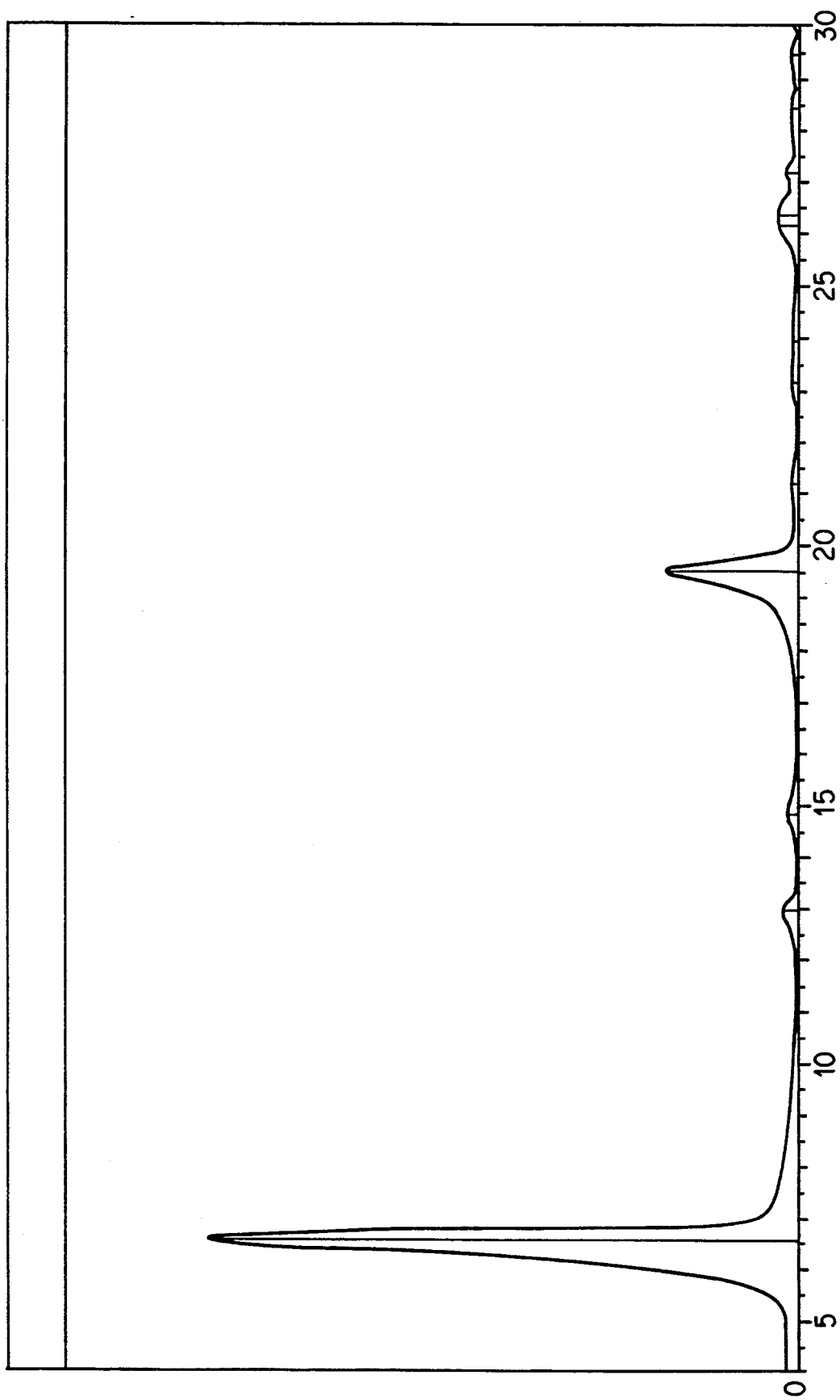
FIG. 1 is an X-ray pattern of the new platelet form of 1,4-diketo-3,6-diphenylpyrrolo-[3,4-C]-pyrrole recrystallized according to the present invention.

Surprisingly, it has now been discovered that it is possible to obtain a new platelet shaped, flake pigment form of 1,4-diketo-3,6-diphenylpyrrolo-[3,4-C]-pyrrole by heating 1,4-diketo-3,6-diphenylpyrrolo-[3,4-C]-pyrrole to an elevated temperature, generrlly above about 220° C., preferably above about 240° C., in the range from about 240° C. to about 280° C., most preferably from about 245° C. to 260° C. More specifically, 1,4-diketo-3,6-diphenylpyrrolo-[3,4-C]-pyrrole is recrystallized from an aromatic solvent or mixture of aromatic solvents which is heated to the elevated temperature. The elevated temperatures are critical for the formation of the new platelet form of 1,4-diketo- 3,6-diphenylpyrrolo-[3,4-C]-pyrrole.

Generally, the 1,4-diketo-3,6-diphenylpyrrolo-[3,4-C]-pyrrole is heated to an elevated temperature by re-crystallization in an aromatic organic solvent or mixture of aromatic organic solvents having a boiling point of above about 220° C., preferably above about 240° C. Preferably, an aromatic solvent or mixture of aromatic solvents with a boiling point in the range of about 240° to about 280° C., most preferably 245° to 260° C., will be utilized for the recrystallization step. Lower boiling aromatic solvents may be utilized in the recrystallization step, if they can be heated, for example, under pressure, to the temperatures required to yield the new platelet pigment form according to this invention.

The criteria for selecting solvents suitable for recrystallization is well-known to the skilled artisan. Examples of aromatic solvents suitable for use in the present process include biphenyl, para- or meta- or ortho-terphenyl, dibenzyltoluene, α-methyl- or β-methylnaphthalene or mixtures thereof and particularly diphenylether and mixtures of biphenyl with diphenylether.

In a preferred procedure, 1,4-diketo-3,6-diphenylpyrrolo-[3,4-C.]-pyrrole is suspended in the aromatic solvent or mixture of aromatic solvents, and heated above about 220° C., preferably above about 240° C., in the range from about 240° C. to about 280° C., or most preferably from about 245° to about 260° C., for at least about 15 minutes, preferably 30 minutes to about 2 hours. The aromatic solvent is present in an amount from about 3 to about 20 parts, preferably about 5 to about 15 parts, by weight, per part of pigment.

The present platelets can be prepared from substantially pure 1,4-diketo-3,6-diphenylpyrrolo-[3,4-C]-pyrroles or crude 1,4-diketo-3,6-diphenylpyrrolo-[3,4-C]-pyrrole. Crude 1,4-diketo-3,6-diphenylpyrrolo-[3,4-C]-pyrrole can contain up to 3 percent by weight, sometimes more, of impurities. Normally, crude 1,4-diketo-3,6-diphenylpyrrolo-[3,4-C]-pyrrole will contain less than about 1 percent by weight of impurities. Generally, the impurities can come from a number of sources including side reactions during preparation, residues left in the reaction vessel from prior reactions or from impure starting materials. Frequently, the crude 1,4-diketo-3,6-diphenylpyrrolo-[3,4-C]-pyrrole will contain 1,4-diketo-3,6-diphenylpyrrolo-[3,4-C]-pyrroles, which are substituted in either or both of the phenyl groups, as impurities.

It is surprising that impurities in the crude 1,4-diketo-3,6-diphenylpyrrolo-[3,4-C]-pyrroles do not inhibit the formation of the new platelet pigment form of this invention because it is well-known in the art that impurities usually act as particle growth inhibitors. The ability to utilize crude 1,4-diketo-3,6-diphenylpyrrolo-[3,4-C]-pyrroles as the starting material is of commerical significance for reasons which would be obvious to one skilled in the art.

It is known in the art that organic pigments having very large particle size tend to break down when incorporated in plastic media. Depending on the shear forces applied during the extrusion, molding or spinning processes, the colored parts display different hues and color strength. It is also known that pigment particles having a particle size of above 5 $\mu$m can cause gloss problems when applied in automotive paints. Unexpectedly, the platelets of 1,4-diketo-3,6-diphenylpyrrolo-[3,4-C]-pyrrole according to this invention have an average particle size with a diameter of less than 4 $\mu$m and a thickness up to 1.5 $\mu$m. This is a preferred pigment particle size for the application in plastics and paints.

The X-ray diffraction pattern of the pigment platelets of this invention shows bands at nearly the same double glancing angles as unrecrystallized 1,4-diketo-3,6-diphenylpyrrolo-[3,4-C]-pyrrole. However, the present platelets show bands with much different intensities particularly at 12 to 16 and 18 to 20 and a new double peak between 25.5 and 27.0 double glancing angles.

The complete X-ray diffraction pattern measured on a RIGAKU GEIGERFLEX Diffractometer Type D/Max II v 3X, of the platelet pigment form according to this invention, including weak bands in terms of interplanar spacing or corresponding double glancing angles, is as follows:

| Interplanar Spacings (d-value in angstroms) | Intensity | Double glancing angles (degree 2 theta) |
|---|---|---|
| 13.55 | Very strong | 6.5 |
| 6.8 | Weak | 13.0 |
| 6.0 | Weak | 14.8 |
| 4.55 | Strong | 19.5 |
| 4.2 | Very weak | 21.2 |
| 3.8 | Very weak | 23.2 |
| 3.7 | Very weak | 24.0 |
| 3.4 | Weak | 26.2 |
| 3.35 | Weak | 26.4 |
| 3.3 | Weak | 27.2 |
| 3.15 | Very weak | 28.4 |
| 3.0 | Very weak | 29.5 |

A thermal analysis by differential scanning calorimetry of crude 1,4-diketo-3,6-diphenylpyrrolo-[3,4-C]-pyrrole shows an endotherm around 300°–315° C. Since no weight loss is observed in this temperature range, the endotherm is related to a crystal transition of the pigment.

In contrast to crude 1,4-diketo-3,6-diphenylpyrrolo-[3,4-C]-pyrrole and other known platelet forms of 1,4-diketo-3,6-diphenylpyrrolo-[3,4-C]-pyrrole, the present platelet form does not show an endotherm between 290°–320° C. or decomposition up to 400° C. This demonstrates that a thermodynamically more stable pigment is formed by the treatment at elevated temperatures according to this invention.

Figure 2:
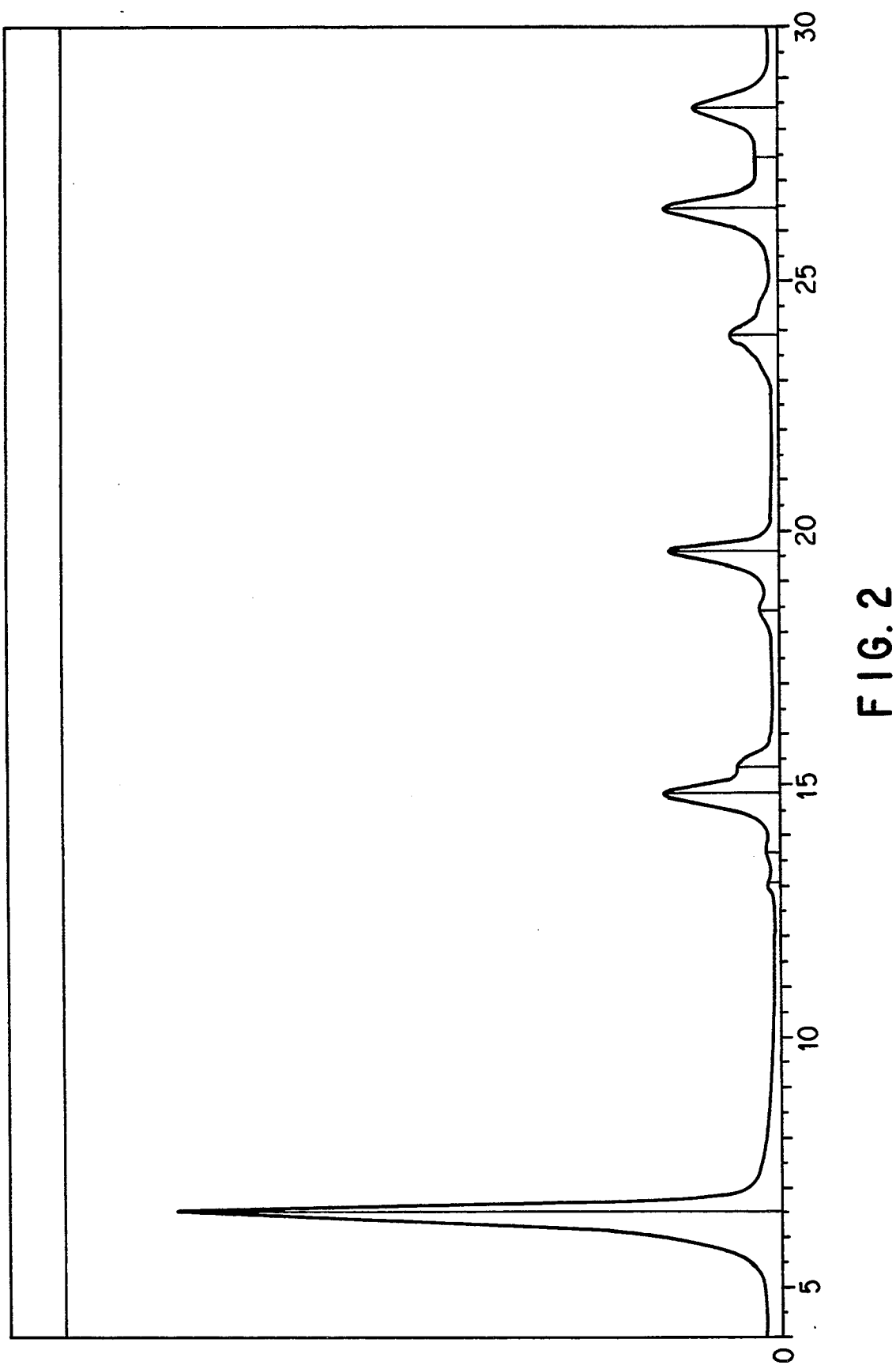
FIG. 2 is an X-ray pattern of crude 1,4-diketo-3,6-diphenylpyrrolo-[3,4-C]-pyrrole.
Figure 3:
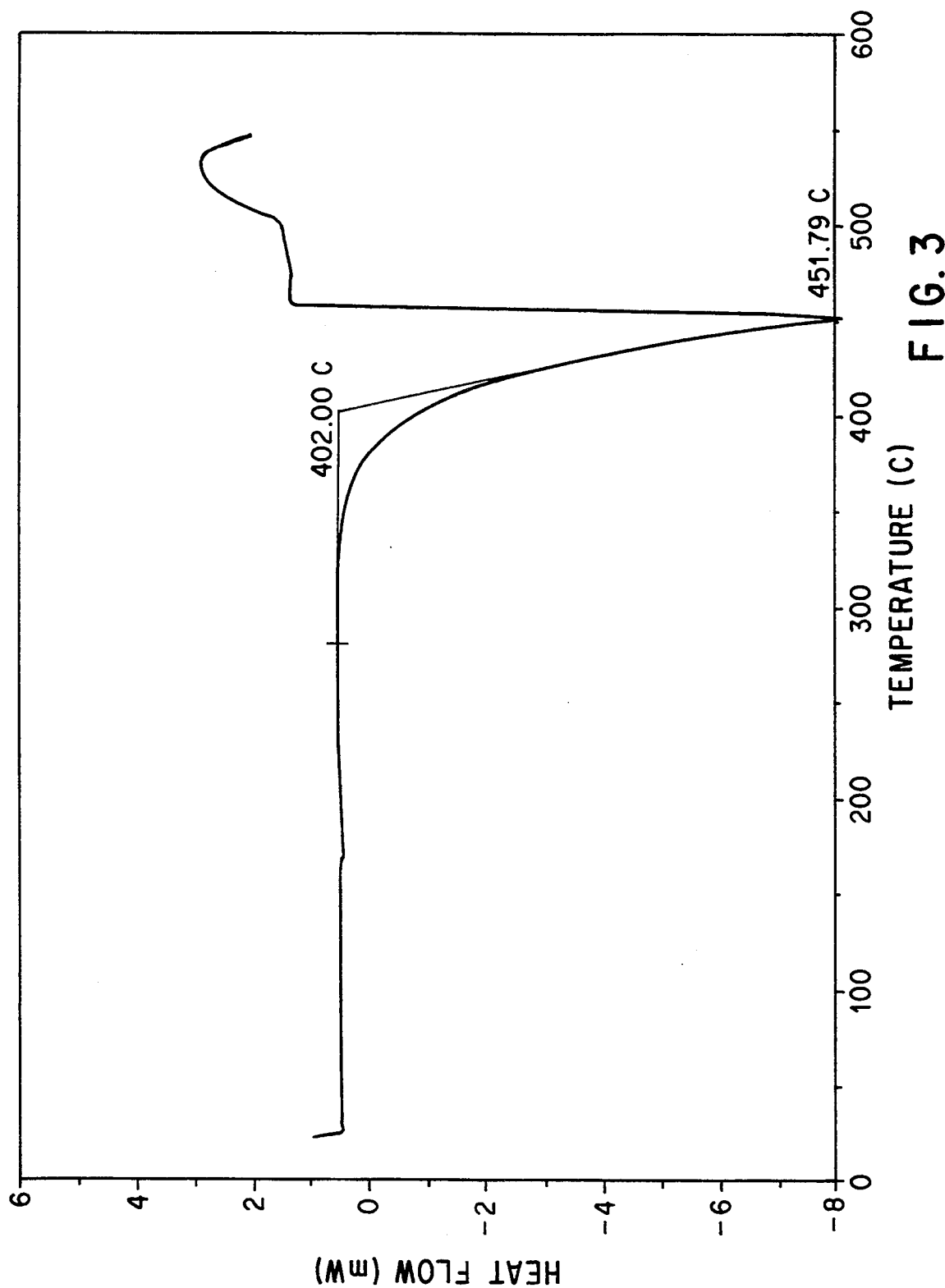
FIG. 3 is a DSC curve of the new platelet form of 1,4-diketo-3,6-diphenylpyrrolo-[3,4-C-]pyrrole recrystallized according to the present invention.
Figure 4:
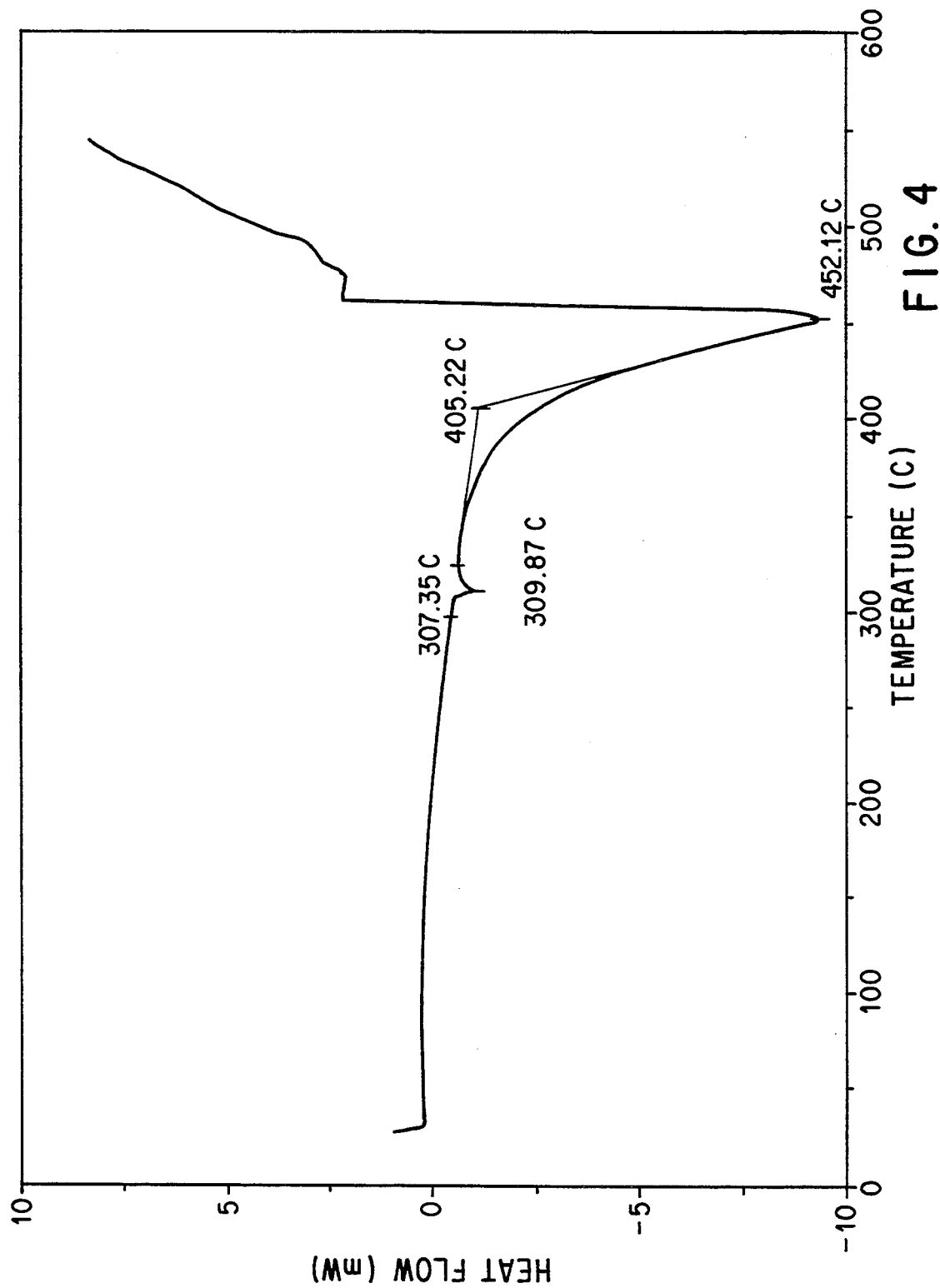
FIG. 4 is a DSC curve of crude 1,4-diketo-3,6-diphenylpyrrolo-[3,4-C]-pyrrole.

The X-ray diffraction pattern of the new platelet form according to the invention is shown in FIG. 1. FIG. 2 shows the X-ray pattern of crude 1,4-diketo-3,6-diphenylpyrrolo-[3,4-C]-pyrrole. Similarly, FIGS. 3 and 4 show, respectively, the DSC curve of the new platelet form of the present invention and the DSC curve of crude 1,4-diketo-3,6-diphenylpyrrolo-[3,4-C]-pyrrole.

When the formation of the new platelet form according to the invention is complete, the pigment, in its desired pigmentary form, is isolated by filtration with the presscake being washed with an organic solvent, preferably methanol or isopropanol, followed by water, and then dried. More preferably, the solvent wet presscake is dried directly, without washing with water, in explosion proof drying equipment.

The new platelet pigment form, according to this invention, is particularly suitable for coloring high molecular weight organic material which can be processed to casted and molded articles and for the pigmentation of lacquers and enamel coating compositions, in particular automotive coating paints.

In this application, the term molded articles is particularly intended to include those articles obtained by orienting stress, for example molding and casting ribbons of fibers and rolled sheets. This includes thermoplastics, thermoset plastics and elastomers which can be processed to molded articles, for example, cellulose ethers, cellulose esters such as ethyl cellulose, linear or crosslinked polyurethanes, linear, crosslinked or unsaturated polyesters, polycarbonates, polyolefins such as polyethylene, polypropylene, polybutylene or poly-4-methylpent-1-ene, polystyrene, polysulfones, polyamides, polycyclamides, polyimides, polyethers, polyether ketones such as polyphenylene oxides, and also poly-p-xylylene, polyvinyl halides such as polyvinyl chloride, polyvinylidene chloride or fluoride, polytetrafluoroethylene, polyacrylonitrile, acrylic polymers, polyacrylates, polymethacrylates, rubber, silicone polymers, phenol/formaldehyde resins, epoxy resins, styrene-butadiene rubber, acrylonitrile-butadiene rubber or chloroprene rubber, singly or in mixtures.

Examples of suitable coating compositions are heatcurable coatings, air-drying or physically-drying coatings or cross-linking, chemically-reactive coatings. Stoving finishes which contain the customary binders which are reactive at high temperature, for example acrylic alkyd, epoxy, phenolic, melamine, urea, polyester, polyurethane, blocked isocyanate, benzoguanamine or cellulose ester resins, or combinations thereof, are particularly suitable. Suitable air-drying or physically-drying coatings are, in particular, the conventional lacquers used especially in the cosmetics industry, for example for the preparation of nail varnishes, and those known to the skilled artisan, for example nitrocellulose lacquers.

The new platelet pigment form of 1,4-diketo-3,6-diphenylpyrrolo-[3,4-C]-pyrrole can be used in coatings conventionally employed in the automobile industry, especially in acrylic/melamine resin, alkyd/melamine resin or thermoplastic acrylic resin systems, as well as in aqueous based coating systems.

The high molecular weight organic compounds mentioned can be present individually or in mixtures as plastic materials, melts or in the form of spinning solutions, lacquers, paints as well as aqueous paints or printing inks. Depending on the intended use, it is found to be advantageous to use the new platelet pigment form according to the invention as a toner or in the form of formulated preparations.

Based on the weight of the high molecular weight organic material to be pigmented, the new platelet pigment form, according to the invention, can be used in an amount of 0.01 to 30% by weight, preferably 0.1 to 10% by weight.

The high molecular weight organic substances are pigmented with the new platelet pigment form according to the invention for example by mixing such a new platelet pigment form, if desired in the form a masterbatch, into these substrates using roll mills or a mixing or grinding apparatus. The pigmented material is then brought into the desired final form by methods such as calendering, pressing, extruding, brushing, casting or injection molding. To produce non-rigid moldings or to reduce their brittleness, it is frequently desirable to incorporate plasticizers into the high molecular weight compounds before the shaping operation. Suitable plasticizers are, for example, esters of phosphoric acid, phthalic acid or sebacic acid. Plasticizers can be incorporated into the polymers either before or after the incorporation of the new platelet pigment of the invention.

Although the new platelet pigment form of 1,4-diketo-3,6-diphenylpyrrolo-[3,4-C]-pyrrole according to the present invention has excellent application properties, it can be further improved by the incorporation of texture improving agents. Suitable texture improving agents are, for example, fatty acids having at least 12 carbon atoms, such as stearic acid or behenic acid; amides, esters or salts thereof, such as magnesium stearate, zinc stearate, aluminum stearate or magnesium behenate; quaternary ammonium compounds, such as tri-($C_1$–$C_4$)-alkylbenzyl-ammonium salts; plasticizers, such as epoxidized soya bean oil; waxes, such as polyethylene wax; resin acids, such as abietic acids, rosin soap, hydrogenated or dimerized rosin; $C_{12}$–$C_{18}$-paraffin-disulfonic acids; alkylphenols; alcohols; such as stearyl alcohol; laurylamine or stearylamine; and aliphatic 1,2-diols, such as dodecane-1,2-diol. Preferred texture improving agents are laurylamine, stearylamine, aliphatic 1,2-diols, stearic acid, amides, salts or esters thereof, epoxidized soya bean oil, waxes, resin acids and salts thereof. These additives can be incorporated in amounts of 0.05 to 20 percent by weight, based on pigment and preferably 1 to 10%.

The new platelet pigment form according to this invention shows a distinct red color shade and in addition manifests a silky-fine, shimmering luster effect; particularly when incorporated as a stir-in pigment in water or solventborne automotive coating systems. The color effect can be varied as a function of the polymer in which it is dispersed and the conditions by which the pigment is incorporated.

Thus, the new platelet pigment form according to this invention is particularly suitable for creating new subtle and attractive reddish color shades in plastics, and particularly, in automotive finishes. The new platelet pigment displays a unique glow and appearance of color depth and color travel effect.

Additionally, useful new unique color shades can be obtained with the new platelet pigment form according to this invention in admixture with other organic and/or inorganic pigments and/or polymer soluble dyes. Particularly, interesting color shades are created when the new platelet pigment form of the invention is used in combination with other "effect" pigments such as pearlescent pigments, graphite and metallic pigments such as aluminum flakes. However, the pigment of the present invention is also suitable for producing effect finishes by itself.

Due to its high opacity and reflectance, the new platelet pigment form is ideally suited in mixtures with known transparent titanium dioxide-coated mica pigments for the generation of new styling shades in automotive finishes and plastics.

Examples of organic pigments are: azo, azomethine, methine, anthraquinone, phthalocyanine, perinone, perylene, dioxazine, diketo-diaryl-pyrrolopyrrole, thioindigo, iminoisoindoline, iminoisoindolininone, quinacridone, quinacridonequinone, flavanthrone, indanthrone, anthrapyrimidine or quinophthalone pigments, and also metal complexes of, for example, azo, azomethine or methine pigments. Pigments having good heat resistance and high transparency are especially suitable. Preferred organic pigments are phthalocyanines, anthraquinones, perylenes,diketo-diaryl-pyrrolopyrroles, iminoisoindolinones, quinacridones, indanthrones and disazo pigments.

Examples of inorganic pigments are metal oxides such as iron oxide, antimony yellow, bismuth vanadate, lead chromates, lead chromate sulfates, lead molybdates, ultramarine blue, cobalt blue, manganese blue, chrome oxide green hydrated chrome oxide green, cobalt green, and also metal sulfides such as cadmium sulfide, zinc sulfide, antimony trisulfide and cadmium sulfoselenides. Examples of preferred inorganic pigments are lead chromates, lead chromate sulfates, lead molybdates and iron oxides.

Examples of suitable polymer soluble dyes are anthraquinone or phthalocyanine based dyes or metal complexes of azo dyes, as well as fluorescent dyes such as those of the coumarin, naphthalimide, pyrazoline, acridine, xanthene, thioxanthene, oxazine, thiazine or benzthiazole series.

Examples of pearlescent pigments are natural and synthetic pearlescent pigments such as the silvery-white pearlescent pigments, for example, the so-called natural "fish scale" pigments or, as synthetic pearlescent pigments, basic lead carbonate, bismuth oxychloride, bismuth oxychloride on carder and, in particular, the titanium dioxide-coated mica pigments, which may also contain other colored metal oxides such as iron oxide, cobalt oxide, manganese oxide or chromium oxide.

Examples of other effect pigments are graphite and molybdenum disulfide in an optimized platelet pigment form as described in U.S. Pat. Nos. 4,517,320 and 5,063,258.

The heat resistance, lightfastness and fastness to weathering of the new platelet pigment form according to the invention are excellent. Furthermore, the pigment of the present invention can be very readily incorporated into the organic matrix, providing homogenous effect colorations with color strength, saturation and opacity.

The following examples further describe the embodiments of the instant invention. In these examples, all parts given are by weight unless otherwise indicated.

EXAMPLE 1

A two liter flask equipped with thermometer, stirrer and condenser is flushed with nitrogen and then charged with 50 grams 1,4-diketo-3,6-diphenylpyrrolo-[3,4-C]-pyrrole crude pigment form and 500 ml THERMINOL VP, a mixture of 73.5% diphenylether with 26.5% biphenyl from MONSANTO. The suspension is stirred, heated to 245°-253° C. and kept stirring for 2 hours at 245°-253° C., whereby the pigment is recrystalized and fine lustrous pigment platelets are generated.

The suspension is cooled to room temperature, diluted with 100 ml methanol and the new platelet pigment form is isolated by filtration. The presscake is washed with methanol followed by water and dried at 80° C., affording 47.9 grams lustrous red pigment. When pulverized, it can readily be incorporated into automotive paints and thermoplastics.

Scanning electron micrographs of the isolated pigment show particles of marked flakelike to platelet appearance with an average particle size of 1 to 4 $\mu$m. A thermal analysis by differential scanning calorimetry is displayed in FIG. 3. The X-ray diffraction pattern of the isolated new platelet pigment form is depicted in FIG. 1. The specific surface area determined by the 302 BET-method is 7.9 $m^2/g$.

EXAMPLE 1-A

The procedure of Example 1 is repeated using 50 grams 1,4-diketo-3,6-diphenylpyrrolo-[3,4-C]-pyrrole crude pigment containing as contamination 2.5% 1,4-diketo-3,6-di-(4-chlorophenyl)-pyrrolo-[3,4-C]-pyrrole yielding a platelet pigment form as described in Example 1. Therefore, contamination with a substituted diketo-diaryl-pyrrolopyrrole derivative does not influence the formation of the new platelet pigment form by the process of the instant invention.

EXAMPLE 2

The procedure of Example 1 is repeated using 500 ml diphenylether from MONSANTO instead of THERMINOL VP yielding a platelet pigment form as described in Example 1.

EXAMPLE 3

63.0 grams of polyvinylchloride, 3.0 g epoxidized soya bean oil, 2.0 grams of barium/cadmium stabilizer, 32.0 grams dioctylphthalate and 1.0 grams of the new platelet 1,4 -diketo-3,6-diphenylpyrrolo-[3,4-C]-pyrrole prepared according to Example 1 are mixed together in a glass beaker using a stirring red.

The mixture is formed into a soft PVC sheet with a thickness of 0.4 mm by being rolled for 8 minutes on a two-roll laboratory mill at a temperature of 160° C., a speed of 25 rpm and a friction of 1.2 by constant folding, removal and feeding. The resulting soft PVC sheet is colored in a tinctorial strong silky red orange shade with excellent fastness to heat, light and migration.

EXAMPLE 4

The procedure described in Example 2 is repeated using 0.5 grams of the new platelet 1,4-diketo-3,6-diphenylpyrrolo-[3,4-C]-pyrrole and additionally 0.75 grams pigment IRIODIN Ti-100 (MERCK) to give a soft PVC sheet with a bright lustrous red bronze colored shade of comparably good fastness properties.

EXAMPLE 5

The following mixture is prepared in a fluid mixer by stirring for about 5 minutes at a speed of 1400 rpm.
92.0 g—vinyl resin (VINNOL H65D, WACKER)
8.0 g—vinyl copolymer (VESTOLIT HIS 7587, HuLS)
1.5 g—epoxidized soya bean oH plasticizer
2.8 g—barium/cadmium stabilizer
0.7 g—organic phosphite auxiliary stabilizer (IRGASTAB CH-300, CIBA-GEIGY AG)
0.4 g—fatty acid ester (IRGAWAX 370, CIBA-GEIGY AG)

0.2 g—paraffin oil derivative lubricant (IRGAWAX 360, CIBA-GEIGY AG)

0.25 g—benzotriazole derivative light stabilizer (TINUVIN 320, CIBA-GEIGY AG)

A mixture of 1.5 parts by weight of the rigid PVC mixture so obtained, 0.05 parts by weight of the new platelet 1,4-diketo-3,6-diphenylpyrrolo-[3,4-C]-pyrrole, prepared in Example 1 and 0.05 parts by weight of pearlescent pigment IRIODIN Ti-100 (MERCK) is prepared in a Henschel mixer at room temperature for about 3 minutes at a speed of about 2000 rpm. The pigmented rigid PVC so obtained is pressed on a roll mill for 6 minutes at 190° C., 25 rpm and a friction of 1:1.2, and then pressed at 190° C. for 6 minutes on a Burkle press between chromium-plated steel plates to a thickness of about 1 mm. The pressed sheet so obtained is colored with a shimmering lustrous red orange shade exhibiting excellent fastness to light and weathering.

EXAMPLE 6

A mixture of 1.0 gram of the new platelet 1,4-diketo-3,6-diphenylpyrrolo-[3,4-C]-pyrrole obtained according to Example 1, 1.0 gram of antioxidant (IRGANOX 1010, CIBA-GEIGY AG) and 1000 grams of high density polyethylene granules (VESTOLEN A 6016, HALS) is stirred for 15 minutes in a glass flask on a. roller gear table. The mixture is then extruded in two passes in a single screw extruder. The granulate so obtained is molded at 220° C. in an injection molding machine and then post-formed for 5 minutes at 180° C. The moldings are colored with a shimmering red orange shade of excellent fastness properties.

EXAMPLE 7

The procedure in Example 6 is repeated with the exception that the polymer is replaced by 1000 grams polystyrene granules to give pressed plates colored with a shimmering red orange shade of excellent fastness properties.

EXAMPLE 8

The following mixture is prepared in a Kitchen Aide mixing bowl by mixing at low speed for 10 minutes using the following ingredients:

5.0 g of the new platelet 1,4-diketo-3,6-diphenylpyrrolo-[3,4-C]-pyrrole obtained according to Example 1.

5.5 g stabilizer package containing
0.25 parts CHIMASSORB 944LD (hindered amine light stabilizer)
0.07 parts IRGANOX 1010 (hindered phenol antioxidant)
0.13 parts IRGAFOS 168 (phosphite process stabilizer)
0.1 part TINUVIN 328 (benzotriazol UV absorber)
all from CIBA-GEIGY Corp.
989.5 g high density polyethylene MICRETHENE ME778 from U.S.I. Quantum Chemicals.

The blended mixture is extruded at 380°–425° F. and pelletized using a CONAIR Jetro Strand pelletizer.

The so obtained colored granules were molded on an Arbourg Allrounder injection molder with a 5 minute dwell time and a 30-second cycle time at temperatures of 450° F., 500° F., 550° F. an 600° F., respectively. Homogenous orange-colored chips were obtained showing a similar color shade at each of the temperature steps, thus showing the excellent heat stability of the new platelet pigment form according to the invention.

EXAMPLE 9

Six grams of the new platelet 1,4-diketo-3,6-diphenylpyrrolo-[3,4-C]-pyrrole prepared according to Example 1 are stirred into 20 grams of a mixture of the following composition: 50 grams of a mixture of aromatic hydrocarbons (SOLVESSO 150, ESSO), 15 grams of butylacetate, 5 grams of ketoxime-based leveling agent, 25 grams of methyl isobutyl ketone and 5 grams of silicone oil (1% in SOLVESSO 150). After complete dispersion has been attained, 48.3 grams of acrylic resin (51% in xylene/butanol 3:1) BAYCRYL L 530 (BASF) and 23.7 grams of melamine resin MAPRENAL TTX (HOECHST) 55% in butanol are added. The batch is briefly homogenized, and the resultant coating composition is then sprayed onto a metal sheet and stoved for 30 minutes at 130° C. The finish so obtained has a free lustrous red shade of excellent fastness properties. The enamel is distinguished by the excellence of the pigment dispersion and very good flow properties.

EXAMPLE 10

9.0 grams of the new platelet 1,4-diketo-3,6-diphenylpyrrolo-[3,4-C]-pyrrole obtained according to Example 1 are stirred into 25.2 grams polyester resin, 60% in SOLVESSO 150, (DYNAPOL H 700, DYNAMIT NOBEL)

2.7 g—reelamine resin, 55% in butanol, (MAPRENAL MF 650, HOECHST)

15.5 g—cellulose acetobutyrate (25% in xylene/butyl acetate 1:2)

1.1 g—catalyst based on mineral oil/carboxylate (IRGASOL TZ6, CIBA-GEIGY AG)

23.3 g—butyl acetate 11.6 g—xylene 11.6 g—SOLVESSO 150 (ESSO)

The pigment dispersion is then diluted with a mixture of butyl acetate/xylene/SOLVESSO 150 (in the same proportions as shown above) to a viscosity of about 18 seconds (20° C.) according to DIN 4 and subsequently sprayed onto a metal sheet. After brief exposure to air (2 minutes at about 40° C.), the pigmented primer coating is further coated with a clear unpigmented top coat comprised of:

58.3 g—acrylic resin, 60% in xylene, (VIACRYL VC 373, VIANORA)

27.3 g—melamine resin, 55% in butanol (MAPRENAL MF590, HOECHST)

1.0 g—silicone oil a-1% in xylene (BAYER)

1.0 g—benzotriazole derivative (TINUVIN 900, CIBA-GEIGY AG)

5.4 g—xylene 4.0 g—SOLVESSO 150 (ESSO)

3.0 g—ethylene glycol acetate

The coating is exposed to air for 30 minutes at 40° C. and then stoved for 30 minutes at 135° C.

The lustrous red colored coating so obtained has excellent fastness properties. It has high gloss and distinctness of image. Exposure of the coating to light from an artificial light source or to sunlight produces a distinct glitter effect which results from the pigment particles present in the coating.

EXAMPLE 11

This example illustrates the incorporation of the platelet pigment into high solids enamels.

PIGMENT DISPERSION FORMULATION

Into a 1 pint can is introduced 12 grams of the platelet pigment prepared according to Example 1 and 12 grams Exterior Mearlin Bright White 139X, a transparent titanium dioxide coated mica pigment from the Mearl Corp., followed by 68.6 grams of acrylic resin and 57.5 grams of xylene. The mixture is agitated moderately with an impeller stirrer. The dispersion contains 16% pigment and 48% solids at a pigment to binder ratio of 0.5.

CATALYST AND STABILIZER SOLUTION FORMATION

In a gallon jar are mixed with an impeller stirrer 855 grams ethyl acetate, 2039 grams UV-screener solution (contains benzotriazol UV absorber TINUVIN 1130 from CIBA-GEIGY Corp.) and 33 grams of an amine solution (N-propylamine in xylene, methanol, butanol). A mixture of 47.0 grams methanol and 156 grams dodecyl benzenesulfonic acid is added and the resulting solution is stirred for 20 minutes.

PAINT FORMULATION 33.4 grams of above described pigment dispersion, 38.2 grams of acrylic resin, 27.0 grams of melamine resin and 28.9 grams of catalyst and stabilizer solution are mixed and diluted with xylene to spray viscosity of 13-17 seconds using No. 4 FORD cup. The paint (masstone) is sprayed onto a primed aluminum panel exposed to ambient air for 10 minutes and stoved for 30 minutes at 130° C.

The silky metallic lustrous red colored coating so obtained has excellent weatherability and a unique color shade. Exposure of the coating to light from an artificial light source or to sunlight produces a distinct yellowish-red glitter effect which results from the pigment platelets present in the coating.

Summarizing, it is seen that this invention provides a unique process for preparing 1,4-diketo-3,6-diphenyl-pyrrolo-[3,4-C]-pyrrole in a new platelet form. Variations may by made in proportions, procedures and materials without departing from the scope of the invention as defined by the following claims.

I claim:

1. A platelet form of 1,4-diketo-3,6-diphenylpyrrolo-[3,4-C]-pyrrole, characterized by an X-ray diffraction pattern exhibiting one very strong line corresponding to 2Θ double glancing angles of 6.5, one strong line corresponding to 19.5 and five relatively weak lines corresponding to 13.0, 14.8, 26.2, 26.4 and 27.2.

2. 1,4-diketo-3,6-diphenyl-pyrrolo-[3,4-C]-pyrrole of claim 1, characterized by a differential scanning calorimetry curve without endotherm peak between 300°-315° C. and without decomposition up to 400° C.

3. 1,4-diketo-3,6-diphenyl-pyrrolo-[3,4-C]-pyrrole of claim 1 consisting essentially of platelets having an average particle size with a diameter of less than 4 $\mu$m and a thickness up to 1.5 $\mu$m.

4. A process for the preparation of the platelet form of 1,4-diketo-3,6-diphenylpyrrolo[3,4-C]-pyrrole of claim 1, which comprises recrystallizing 1,4-diketo-3,6-diphenylpyrrolo-[3,4-C-]pyrrole from an aromatic solvent or a mixture of aromatic solvents which is heated to a temperature above about 220° C.

5. A process of claim 4 which comprises recrystallizing crude 1,4-diketo- 3,6-diphenyl-pyrrolo-[3,4-C]-pyrrole from a aromatic solvent or a mixture of aromatic solvents which is heated to a temperature above about 220° C.

6. A process of claim 5 wherein the temperature is above about 240° C.

7. A process of claim 6 wherein the temperature is from 245° C. to 260° C.

8. A process of claim 5, wherein said aromatic solvent is selected from the group consisting of diphenyl ether and mixtures of biphenyl with diphenyl ether.

9. A process of claim 8 wherein the temperature is above about 240° C.

10. A process of claim 9 wherein the temperature is from 245 °C. to 260 ° C.

11. A process of claim 7 wherein said aromatic solvent or mixture of aromatic solvents is heated to the required temperature range for at least 15 minutes.

12. A process of claim 11 wherein said aromatic solvent or mixture of aromatic solvents is heated to the required temperature range for from 30 minutes to 2 hours.

13. A process of claim 4 wherein the aromatic solvent has a boiling point from 240 ° C. to 280° C.

14. A process of claim 4 wherein the aromatic solvent is selected from the group consisting of biphenyl, diphenylether, para-terphenyl, ortho-terphenyl, meta-terphenyl, dibenzylotoluene, $\alpha$-methylnaphthalene and $\beta$-methylnaphthalene or a mixture thereof.

15. A process of claim 14 wherein the aromatic solvent is selected from the group consisting of diphenyl ether and mixtures of biphenyl with diphenyl ether.

16. A process of claim 7 wherein the aromatic solvent is selected from the group consisting of biphenyl, diphenylether, para-terphenyl, ortho-terphenyl, meta-terphenyl, dibenzyltoluene, $\alpha$-methylnaphthalene and $\beta$-methylnaphthalene or a mixture thereof.

* * * * *